United States Patent [19]

Welling

[11] Patent Number: 5,287,938
[45] Date of Patent: Feb. 22, 1994

[54] VEHICLE SUITABLE FOR ON- AND OFF-ROAD USE

[75] Inventor: Engbert Welling, Oudehaske, Netherlands

[73] Assignee: Verenigde Bedrijven Van den Berg Heerenveen Holding B.V., Heerenveen, Netherlands

[21] Appl. No.: 3,950

[22] Filed: Jan. 14, 1993

Related U.S. Application Data

[63] Continuation of Ser. No. 793,510, Nov. 15, 1991, abandoned, which is a continuation of Ser. No. 570,781, Aug. 22, 1990, abandoned.

[30] Foreign Application Priority Data

Aug. 25, 1989 [NL] Netherlands .................. 8902162

[51] Int. Cl.⁵ ............................................. B62D 55/02
[52] U.S. Cl. ................................ 180/9.3; 18/9.28; 18/9.34
[58] Field of Search ................ 180/9.26, 9.28, 9.3, 180/9.34, 9.42, 9.5, 9.1; 280/6.1, 6.11, 6.12, DIG. 1

[56] References Cited

U.S. PATENT DOCUMENTS

| | | | |
|---|---|---|---|
| 1,296,309 | 3/1919 | Netzel | 180/9.28 |
| 1,355,853 | 10/1920 | Lothringen | 180/9.28 X |
| 1,550,982 | 8/1925 | Phillips | 180/9.3 |
| 2,287,290 | 6/1942 | Brown | 180/9.28 |
| 4,204,583 | 5/1980 | Toyoura et al. | 180/9.28 |
| 4,541,498 | 9/1985 | Pitchford | 180/9.28 X |

FOREIGN PATENT DOCUMENTS

| | | | |
|---|---|---|---|
| 477413 | 5/1929 | Fed. Rep. of Germany | 180/9.3 |
| 532235 | 8/1931 | Fed. Rep. of Germany | 180/9.3 |
| 692558 | 6/1940 | Fed. Rep. of Germany | 180/9.3 |
| 2601222 | 7/1977 | Fed. Rep. of Germany | 180/9.5 |
| 2811675 | 9/1979 | Fed. Rep. of Germany | 180/9.34 |
| 510446 | 9/1920 | France | 180/9.3 |
| 0593598 | 8/1925 | France | 180/9.3 |

*Primary Examiner*—Margaret A. Focarino
*Assistant Examiner*—Anne Marie Boehler
*Attorney, Agent, or Firm*—Beehler & Pavitt

[57] ABSTRACT

A vehicle suitable for on-and off-road use has a track drive with auxiliary frames mounted under the vehicle frame between front and rear wheels, the auxiliary frames having continuous tracks on carrier wheels driven by hydraulic motors, each auxiliary frame being independently vertically displaceable relative to the vehicle frame by means of corresponding lifting cylinders between a fully retracted position for travel on wheels only, and a fully extended position for tracks only travel. The lifting cylinders are adjustable for leveling the vehicle to a horizontal position on uneven ground while the vehicle is supported on the tracks. Such an auxiliary track drive can be installed in an existing motor vehicle for improved off road usage and particularly for use in soil sounding applications.

8 Claims, 1 Drawing Sheet

VEHICLE SUITABLE FOR ON- AND OFF-ROAD USE

This is a continuation of co-pending application Ser. No. 07/793,510, filed on Nov. 15, 1991, now abandoned which is a continuation application of Ser. No. 07/570,781 filed on Aug. 22, 1090 now abandoned.

BACKGROUND OF THE INVENTION

For operations off normally passable roads, e.g. for performing soil sounding operations and the like, off-road vehicles are being used with plural wheeldrive and special off-road transmissions. In order to obtain a dependable drive, generally three-axle vehicles with double rear axles are being used, and, moreover, special transmissions with a high deceleration and differential blocking are utilized.

For transport on the road, however, generally a two-axle vehicle will be sufficient. It is an object of the invention to provide such a vehicle which is also suitable for off-road operations. The motor vehicle according to the invention can be obtained, in particular, by a suitable adaptation of a current two-axle vehicle, and has the characteristics mentioned in the characterizing portion of claim 1.

In this manner a normal motor vehicle can be made suitable, for being used as an off-road vehicle. As known continuous tracks are very efficient for this purpose. Since, for the envisaged purposes, the driving speeds off-road are relatively low, e.g. not more than about 5 km/h, such a track drive can, therefore, be constructed in a rather simple way since no spring suspension is required.

In particular the drive of the auxiliary frame provided with continuous tracks can be coupled with the shift means of the transmission, so that the track drive will be automatically switched on and off as soon as the auxiliary frame is lowered or retracted respectively.

If the vehicle should be horizontally positioned during operations, e.g. in the case of soil sounding or soil drilling operations, the driving means for the auxiliary frame can be used for positioning the vehicle horizontally when the caterpillar tracks have been lowered.

BRIEF DESCRIPTION OF THE DRAWINGS

The invention will be elucidated below by reference to a drawing, showing in:

FIG. 1 shows a motor vehicle constructed as a soil sounding vehicle. In contrast to the current sounding vehicles, this vehicle, is constructed as a two-axle lorry.

DETAILED DESCRIPTION OF THE PREFERRED EMBODIMENTS

Figure 1:
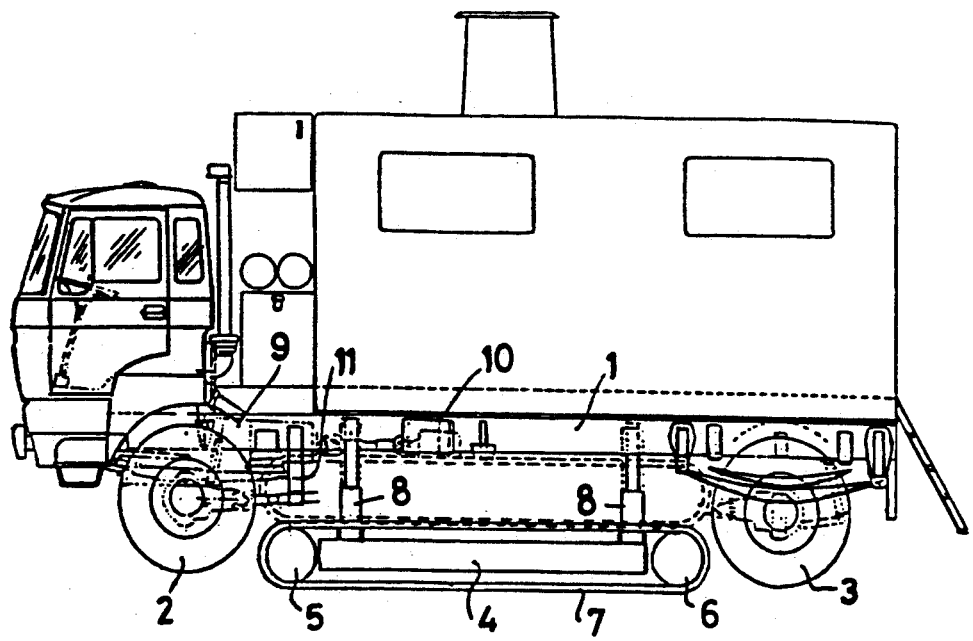
FIG. 1 a lateral view of a motor vehicle provided, according to the invention, of an additional track drive.

The frame 1 of this vehicle is provided with front wheels 2 and rear wheels 3, which, in the case shown, can both be driven; however, this is not strictly necessary.

Below the frame 1 and between the wheels 2 and 3 an auxiliary frame 4 is provided at each side, said auxiliary frames 4 each being provided with two guiding wheels 5 and 6 on which continuous track 7 is guided, and, if required, between the guiding wheels 5 and 6 additional support rolls for the intermediate portion of the track drive in question can be provided.

Each auxiliary frame 4 is coupled with the frame 1 by means of a mechanical construction provided at its extremities, comprising hydraulic cylinders 8, to which cylinders 8 pressurized oil can be supplied which is provided by an oil pump 10 coupled with the vehicle engine 9.

When the vehicle is to drive on a road, the auxiliary frames 4 are to be retracted, as indicated in FIG. 1 with interrupted lines. When the wheel drive becomes insufficient for moving the vehicle on a difficultly passable ground surface, the auxiliary frames 4 are brought, by means of the hydraulic cylinders 8, in the position shown, after which the wheel drive can, be interrupted, and the guiding wheels 5 and 6 for the continuous tracks 7 are being driven.

This drive can take place directly from the engine 9 with the intermediary of a reduction transmission and a differential, and, by braking one differential axle the speed of the tracks can be controlled in the known manner for allowing the vehicle to be steered. It is also possible to provide, in the auxiliary frames, hydraulic motors for the continuous tracks which are supplied from the liquid pump 10 or a similar pump with pressurized oil. It is also possible to arrange the auxiliary frames 4 and to lower them by means of the cylinders 8 in such a manner that the steering wheels of the front axle 2 and the wheels of the rear axle 3 remain on the ground so as to allow to steer the vehicle, and to improve the off-road stability.

It will be clear that the auxiliary frames 4 or the hydraulic cylinders will be provided with means for determining the extreme positions thereof, and that the hydraulic system is so that, in said extreme positions, the required blocking thereof will be obtained. It is, of course, also possible to replace the hydraulic cylinders 8 by a comparable screw drive, but a hydraulic drive has practical advantages.

When the vehicle is to be used for performing soil sounding or drilling operations, the frame thereof should be placed in a horizontal position. With the current vehicles for this purpose this is done by means of extendable jacks. In the present case, use can be made for this purpose of the hydraulic cylinders 8, to which, as desired, oil is to be separately supplied until the desired horizontal position has been reached.

Figure 2:
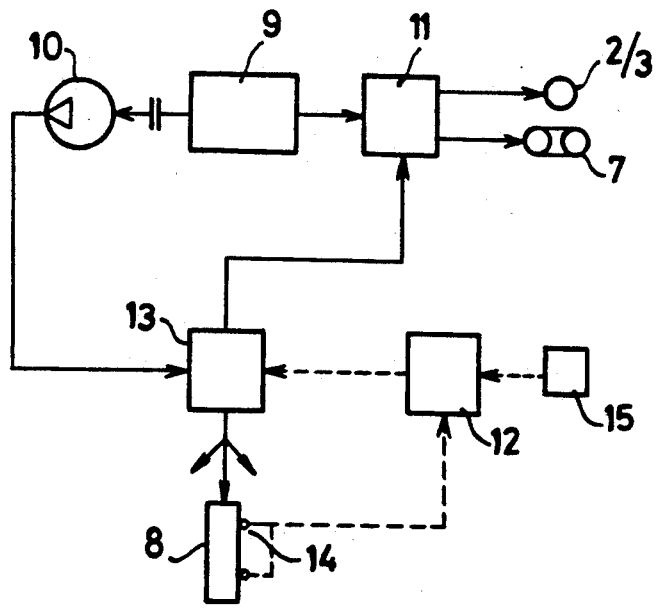
FIG. 2 a simplified block diagram of control means for said track drive.

FIG. 2 shows a simplified block diagram of the driving and control means for such a vehicle.

The engine 9 can be selectively coupled by means of a shiftable transmission 11 with the wheels 2 and/or 3 or with the drive for the continuous track 7. The oil pump 10 is coupled with the engine 9, if required by means of current control means.

A general control stage 12 provides the desired control. The pump 10 delivers pressurized oil to a distributor 13 which, under control of the control stage 12, can supply pressurized oil to the cylinders 8, sensors 14 for the extreme positions of the auxiliary frame 4 being connected with the control stage for switching off the oil supply and locking the auxiliary frame 4. Moreover the distributor 13 is coupled with the transmission 11, in order to switch, after lowering or retracting the auxiliary frame 4, the transmission accordingly.

A leveling apparatus 15 is connected with the control stage 12 for orienting the frame 1 horizontally by means of the distributor 13 by such a separate oil supply towards the different cylinders 8 that the vehicle will be horizontally directed.

It will be clear that such a control system can be realized and extended in many different ways.

It is, for instance, possible to lower the auxiliary frames 4 so far that the driven wheels remain in contact with the underline ground surface. In particular the cylinders 8 (without being blocked) can be maintained under such a pressure that the continuous tracks 7 will be pushed with a given force against the underlines ground surface in order to take up a portion of the load by the continuous tracks 7, these tracks then following irregularities of the field in order to avoid loss of contact between the wheels 2 or 3 and the underline ground surface. In that case the track drive speed should be adapted to the wheel speed.

It will be clear that the auxiliary frames can also be used in the case of three-axle vehicles. In that case it can often be favourable to use one or more additional jacks for leveling the vehicle.

An additional advantage of these track drive frames 7 is that, in the case of lighter vehicles, they will provide an increase of the mass, which is required in the case of soil sounding operations and the like for providing the required counter pressure.

I claim:

1. An auxiliary track-drive for a conventional wheel motor vehicle having a vehicle frame with front and rear wheels drive by a vehicle engine, said track-drive comprising:
    two auxiliary frames each having continuous tracks on carrier wheels, two lifting cylinders spaced apart along each said auxiliary frame for attaching said auxiliary frames to said vehicle frame between said front and rear wheels, each of said lifting cylinders being individually actuable for vertically displacing said auxiliary frames relative to said vehicle frame between
    a completely retracted position wherein said tracks are away from contact with a ground surface supporting said wheels;
    an intermediate position wherein both said wheels and said tracks are in contact with an underlying ground surface and follow irregularities of the ground surface during travel thereon; and
    a fully extended position wherein said tracks are driven over the ground surface and said wheels are raised away from contact with ground surface such that said vehicle frame is supported by said tracks without assistance from said wheels;
    further comprising control means for independently operating each of said lifting cylinders on each said auxiliary frame, said control means being adapted for placing said vehicle frame in a level horizontal position by relative adjustment of all said lifting cylinders while said vehicle is supported only by said tracks on a sloping ground surface; and
    means for deriving power from said motor vehicle for operating said lifting cylinders and for driving said carrier wheels thereby to adapt said conventional wheeled motor vehicle for use on irregular terrain.

2. The vehicle of claim 1 wherein said lifting cylinders are hydraulic cylinder and said means for deriving power comprise an oil pump for coupling to said vehicle engine said oil pump connected for supplying hydraulic fluid to said cylinders.

3. The vehicle of claim 1 wherein said means for driving comprise hydraulic motor means for driving said carrier wheels, said oil pump further connected for supplying hydraulic fluid to said motor means.

4. The vehicle of claim 1 wherein said lifting cylinders are hydraulically operated cylinders.

5. The vehicle of claim 1 wherein said lifting cylinders are screw drives.

6. The vehicle of claim 1 further wherein said control means comprise sensor means associated with each said lifting cylinder.

7. An auxiliary track-drive for a wheeled motor vehicle having a vehicle frame with front and rear wheels driven by a vehicle engine, said track-drive comprising:
    two auxiliary frames each having continuous tracks on carrier wheels, hydraulic motor means for driving said carrier wheels, two hydraulic cylinders spaced apart along each said auxiliary frame for attaching said auxiliary frames to said vehicle frame between said front and rear wheels, each of said cylinders being individually actuatable for vertically displacing said auxiliary frames relative to said vehicle frame between
    a completely retracted position wherein said tracks are away from contact with a ground surface supporting said wheels;
    an intermediate position wherein both said wheels said tracks are in contact with an underlying ground surface and follow irregularities of the ground surface during travel thereon; and
    a fully extended position wherein said tracks are driven over the ground surface and said wheels are raised away from contact with the ground surface such that said vehicle frame is supported by said tracks without assistance from said wheels;
    further comprising control means for independently operating each of said cylinders on each said auxiliary frame, said control means being adapted for placing said vehicle frame in a level horizontal position by relative adjustment of all said cylinders while said vehicle is supported only by said tracks on a sloping ground surface; and
    an oil pump for coupling to said vehicle engine, said oil pump connected for supplying hydraulic fluid to said cylinders, said oil pump further connected for supplying hydraulic fluid to said motor means, thereby to adapt said conventional wheeled motor vehicle for use on irregular terrain.

8. An auxiliary track-drive for a conventional wheeled motor vehicle having a vehicle frame with front and rear wheels driven by a vehicle engine, said track-drive comprising:
    auxiliary frames each having continuous tracks on carrier wheels, a plurality of lifting cylinders spaced apart along each said auxiliary frame for attaching said auxiliary frames to said vehicle frame between said front and rear wheels, each of said lifting cylinders being individually actuable for vertically displacing said auxiliary frames relative to said vehicle frame between
    a completely retracted position wherein said tracks are away from contact with a ground surface supporting said wheels;
    an intermediate position wherein both said wheels and said tracks are in contact with an underlying ground surface and follow irregularities of the ground surface during travel thereon; and
    a fully extended position wherein said tracks are driven over the ground surface and said wheels are raised away from contact with the ground surface such that said vehicle frame is supported by said tracks without assistance from said wheels;

further comprising control means for independently operating each of said lifting cylinders on each said auxiliary frame, said control means being adapted for placing said vehicle frame in a level horizontal position by relative adjustment of all said lifting cylinders while said vehicle is supported only by said tracks on a sloping ground surface; and means for driving said carrier wheels.

* * * * *